(12) United States Patent
Murata et al.

(10) Patent No.: US 9,518,613 B2
(45) Date of Patent: Dec. 13, 2016

(54) DOG CLUTCH

(71) Applicants: Musashi Seimitsu Industry Co., Ltd., Toyohashi-shi, Aichi (JP); Kyushu Musashi Seimitsu Co., Ltd., Kuma-gun, Kumamoto (JP)

(72) Inventors: Daishi Murata, Kumamoto (JP); Yoshihiro Tomimatsu, Kumamoto (JP)

(73) Assignees: MUSASHI SEIMITSU INDUSTRY CO., LTD., Toyohashi-Shi (JP); KYUSHU MUSASHI SEIMITSU CO., LTD., Kuma-Gun (JP)

( * ) Notice: Subject to any disclaimer, the term of this patent is extended or adjusted under 35 U.S.C. 154(b) by 21 days.

(21) Appl. No.: 14/406,818

(22) PCT Filed: Apr. 9, 2013

(86) PCT No.: PCT/JP2013/060743
§ 371 (c)(1),
(2) Date: Mar. 24, 2015

(87) PCT Pub. No.: WO2013/187111
PCT Pub. Date: Dec. 19, 2013

(65) Prior Publication Data
US 2015/0219166 A1 Aug. 6, 2015

(30) Foreign Application Priority Data
Jun. 15, 2012 (JP) .................. 2012-136057

(51) Int. Cl.
*F16D 11/14* (2006.01)
*F16D 21/04* (2006.01)
(Continued)

(52) U.S. Cl.
CPC ............... *F16D 11/14* (2013.01); *F16D 11/10* (2013.01); *F16D 21/04* (2013.01); *F16D 2011/008* (2013.01); *F16D 2300/10* (2013.01)

(58) Field of Classification Search
CPC ..... F16D 11/14; F16D 11/00; F16D 2011/008; F16D 27/09
See application file for complete search history.

(56) References Cited

U.S. PATENT DOCUMENTS

| 2,049,127 A | 7/1933 | Maybach |
| 2,558,203 A | 6/1951 | Wildhaber |
| (Continued) | | |

FOREIGN PATENT DOCUMENTS

| DE | 700712 | 2/1941 |
| JP | S37-28816 | 10/1962 |
| (Continued) | | |

OTHER PUBLICATIONS

International Search Report, Date of mailing: May 21, 2013 (May 21, 2013).

*Primary Examiner* — Mark Manley
(74) *Attorney, Agent, or Firm* — Rankin, Hill & Clark LLP (57) ABSTRACT

A dog clutch that transmits driving force from a driving-side rotating body to a driven-side rotating body. In the bottom face of recessed parts formed in the driving-side rotating body there is a strip-shaped island part protruding from the bottom face in the circumferential direction, and there are groove parts between the island part and torque-receiving surfaces. The groove parts and the bottom face are formed by a forging mold, and their surfaces are forged mill scale. The island parts have a cut surface, which is formed by cutting the top part of the islands after they have been formed by the forging mold, and which receives the tip surface of a protruding part. The groove parts are formed so (Continued)

as to be deeper than the bottom face, and the cut surface is formed as to be shallower than the bottom face.

4 Claims, 12 Drawing Sheets

(51) Int. Cl.
*F16D 11/10* (2006.01)
*F16D 11/00* (2006.01)

(56) References Cited

U.S. PATENT DOCUMENTS

| | | | | |
|---|---|---|---|---|
| 3,223,210 | A | * 12/1965 | Schweizer | ......... B25B 23/1453 |
| | | | | 173/93.6 |
| 4,909,364 | A | 3/1990 | Grimm | |
| 5,273,499 | A | 12/1993 | Friedl et al. | |
| 6,354,417 | B1 | * 3/2002 | Narita | ..................... F16D 11/10 |
| | | | | 192/108 |
| 2008/0194157 | A1 | * 8/2008 | Tsurumi | ................. B63H 20/20 |
| | | | | 440/75 |
| 2010/0140042 | A1 | 6/2010 | Elliott | |

FOREIGN PATENT DOCUMENTS

| | | |
|---|---|---|
| JP | S52-17706 | 2/1977 |
| JP | H05-52362 | 7/1993 |
| JP | 06-079395 | 3/1994 |
| JP | 11-037173 | 2/1999 |
| JP | 2005-048820 | 2/2005 |
| JP | 2007-205527 | 8/2007 |
| JP | 2009-190653 | 8/2009 |

* cited by examiner

(a)
EMBODIMENT (b)
COMPARATIVE EXAMPLE

(b)
COMPARATIVE EXAMPLE (c)
EMBODIMENT (d)
EMBODIMENT

(b)
COMPARATIVE EXAMPLE (c)
EMBODIMENT (d)
EMBODIMENT

FIG.11

(a)
COMPARATIVE EXAMPLE (b)
EMBODIMENT

DOG CLUTCH

TECHNICAL FIELD

The present invention relates to a dog clutch suitable for use in a reduction gear.

BACKGROUND ART

Figure 16:
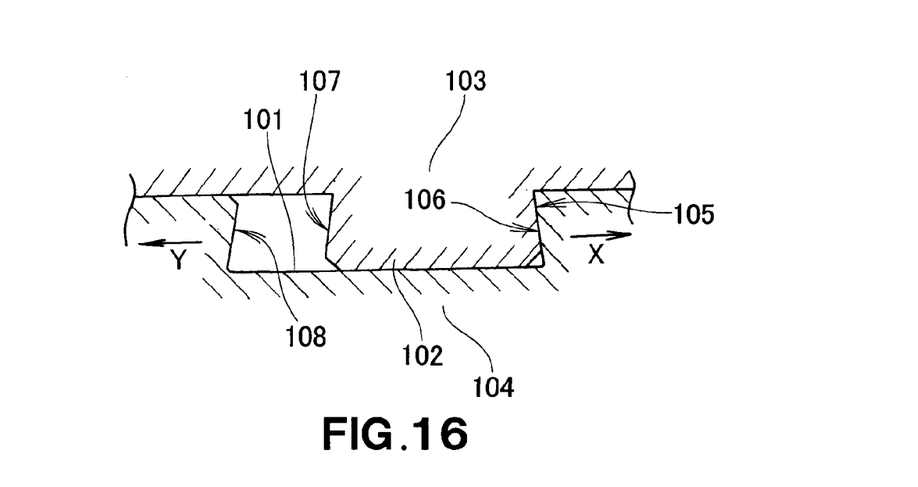
FIG. 16 is a cross-sectional view of a conventional dog clutch.

A positive clutch also called "dog clutch" or "jaw clutch" is used in reduction gears. The positive clutch is a power transmission mechanism of the type wherein protruding parts provided on one of a driving-side rotating body and a driven-side rotating body are brought into meshing engagement with recessed parts provided in the other of the driving-side rotating body and the driven-side rotating body while the driving-side rotating body is rotating so that a driving force is transmitted from the driving-side rotating body to the driven-side rotating body. As to the shape and configuration of the protruding parts and recessed parts, various proposals have been made as disclosed, for example, in Patent Document 1. FIG. 16 hereof shows a dog clutch disclosed in Patent Document 1.

As shown in FIG. 16, a recessed part 101 is engaged with a protruding part 102. The protruding part 102 is formed on a driving-side rotating body 103 and the recessed part 101 is formed in a driven-side rotating body 104. In this instance, when the driving-side rotating body 103 is rotating in a direction of arrow X, a side surface 105 of the protruding part 102 comes into abutment with a torque-receiving surface 106 of the recessed part 101 and, subsequently, the driven-side rotating body 104 is rotated in the direction of arrow X. Alternatively, when the driving-side rotating body 103 is rotating in a direction of arrow Y, a side surface 107 of the protruding part 102 comes into abutment with a torque-receiving surface 108 of the recessed part 101 and, subsequently, the driven-side rotating body 104 is rotated in the direction of arrow Y.

Figure 17:
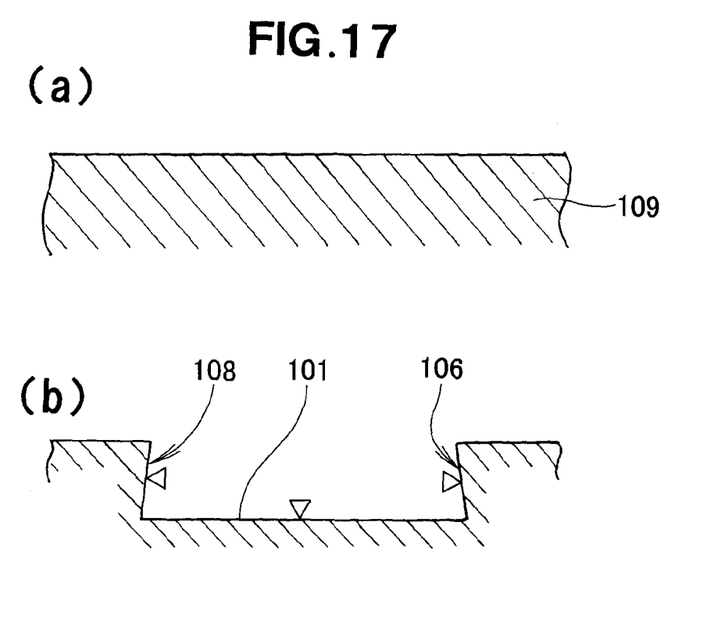
FIG. 17 is a view illustrative of the manner in which the conventional dog clutch is produced.

Patent Document 1 has no disclosure about a method of producing the recessed part 101 of the dog clutch, however, the recessed part is normally formed by cutting. A cutting method will be briefly described with reference to FIG. 17.

As shown in FIG. 17(a), a blank material or workpiece 109 is provided. The workpiece 109 is subjected to a cutting process using an end mill or a milling cutter so as to form a recessed part 101 shown in FIG. 17(b). In FIG. 17(b), a symbol "∇" is a finish symbol used to indicate a texture of machined surface.

The cutting process involves generation of a great amount of chips. Cutting time and machining man-hours increase as the amount of chips increases. Furthermore, generation of a huge amount of chips leads to wasteful consumption of material. A demand for a reduction in the production cost requires reductions of the cutting time and the amount of chips generated.

PRIOR ART LITERATURE

Patent Literature

[Patent Document 1] Japanese Patent Application Laid-Open Publication (JP-A) No. H11-37173

SUMMARY OF INVENTION

Technical Problem

An object of the present invention is to provide a dog clutch which is capable of reducing cutting time and which involves generation of only a small amount of chips

Solution to Problem

According to the invention as defined in claim 1, there is provided a dog clutch having protruding parts provided on one of a driving-side rotating body and a driven-side rotating body and recessed parts provided in the other of the driving-side rotating body and the driven-side rotating body, the protruding parts being adapted to be brought into meshing engagement with the recessed parts to thereby transmit a driving force from the driving-side rotating body to the driven-side rotating body via abutting engagement between side surfaces of the protruding parts and corresponding torque-receiving surfaces of the recessed parts, characterized in that: each of the recessed parts has a bottom face, a strip-shaped island part protruding from the bottom face and extending in a circumferential direction of the driving-side or driven-side rotating body, and groove parts between the island part and the torque-receiving surfaces; the groove parts and the bottom face are formed by means of a forging die and have respective surfaces as forged; the island part has a cut surface which receives a tip surface of the protruding part, the cut surface being formed by cutting a top part of the island part after the island part has been formed by the forging die; and the groove parts are formed so as to be deeper than the bottom face, and the cut surface is formed so as to be shallower than the bottom face.

According to the invention as defined in claim 2, preferably, the strip-shaped island part has one end and an opposite end that are rounded into a semicircular shape.

According to the invention as defined in claim 3, preferably, the driving-side rotating body has a gear section formed on a radially outer side of the recessed parts, each of the recessed parts has a substantially trapezoidal shape and includes an arc-shaped inner edge contiguous with inner ends of the torque-receiving surfaces, and an arc-shaped outer edge contiguous with outer ends of the torque-receiving surfaces, the outer edge being formed to be longer than the inner edge, and the outer edge is connected to the bottom face via an arc-shaped surface having a radius of curvature equal to or greater than a depth of the bottom face.

According to the invention as defined in claim 4, preferably, an arc-shaped surface formed between the outer edge and each of the torque-receiving surfaces has a radius of curvature larger than a radius of curvature of an arc-shaped surface formed between the inner edge and each of the torque-receiving surfaces.

Advantageous Effects of Invention

In the invention as defined in claim 1, the bottom face and the groove parts, which form part of each recessed part with the groove parts located directly below the torque-receiving surfaces, have respective surfaces as forged. The island part protruding from the bottom face is cut on its top part after it has been formed by forging. A great part of the recessed part is left as it was forged and, hence, the amount of chips generated during a cutting process is quite small and the cutting time can be reduced. The dog clutch provided according to the present invention is thus able to reduce the cutting time and lessen the amount of chips generated.

The bottom face which forms part of the recessed part is made to be shallower than the groove parts. If the bottom face and the groove parts have the same depth, the recessed part will become deeper as a whole and a forging die should have a larger projecting length. As the projecting length of the forging die increases, stress created in the forging die during a forging operation becomes large and the service life of the forging die is shortened. Furthermore, the product thickness of the driving-side rotating body or the driven-side rotating body reduces as the depth of the recessed part increases. An increase in the depth of the recessed part necessarily involves a reduction in the product thickness of the driving-side or the driven-side rotating body, which will lead to a reduction in the strength of the driving-side or driven-side rotating body. According to the present invention, the bottom face is made to be shallower than the groove parts. Since a great part or area of the recessed part is occupied by the shallow bottom face, the recessed part becomes shallow as a whole. The forging die is, therefore, allowed to have a shorter projecting length, which will reduce a stress created in the forging die during a forging operation and extend the service life of the forgoing die. The shallow recessed part also allows the driving-side or driven-side rotating body to have an increased product thickness, which will ensure that the driving-side or driven-side rotating body has enhanced strength.

In the invention as defined in claim 2, the both ends, in the circumferential direction, of the island part are rounded into a semicircular shape. The forging die has an island-part-forming groove for forming the island part. The island-part-forming groove has opposite ends rounded into a semicircular shape. The island-part-forming groove can be readily produced by using an endmil. More specifically, the island-part-forming groove can be formed by a single feed stroke of an endmil having an outside diameter corresponding to a width of the island-part-forming groove. Mon-hours required for forming the island-part-forming groove of the forging die can thus be reduced. Furthermore, by virtue of the rounded semicircular ends, the island-part-forming groove is able to avoid stress concentration and contributes to further extension of the service life of the forging die.

In the invention as defined in claim 3, the recessed part has a generally trapezoidal shape, and in a cross-sectional view, the outer edge of the recessed part is connected to the bottom face via the arc-shaped surface having a radius of curvature equal to or larger than the depth of the bottom face. In order to form the bottom face, the forging die has a bottom-face-forming protrusion. Since the bottom-face-forming protrusion has an upper edge rounded into an arc-shaped surface of a large radius of curvature, the durability of the bottom-face-forming protrusion is extremely high and a further extension in the service life of the forging die can be achieved. Furthermore, even when a large torque is transmitted to the gear section provided on a radially outer side of the recessed part, the arc-shaped surface having a large radius of curvature considerably suppresses stress concentration and keeps the dog clutch free from damage.

In the invention as defined in claim 4, the arc-shaped surface formed between the outer edge and each of the torque-receiving surfaces has a radius of curvature larger than a radius of curvature of the arc-shaped surface formed between the lower edge and each of the torque-receiving surfaces. With this combination of the large-radius arc-shaped surface and the small-radius arc-shaped surface, when a torque is transmitted to the gear section provided on an outer peripheral surface of the driving-side rotating body, the large-radius arc-shaped surface provided between the upper edge and the torque-receiving surface can greatly suppress stress concentration and eliminate the rink of breakage of the dog clutch. The arc-shaped surface formed between the lower edge and the torque-receiving surface is located remotely from the gear section and, hence, is allowed to have a small radius of curvature. The small-radius arc-shaped surface formed between the inner edge and the torque-receiving surface provides an increased degree of freedom in designing the shape and configuration of the dog clutch.

DESCRIPTION OF EMBODIMENTS

A certain preferred embodiment of the present invention will be described below in greater detail with reference to the accompanying sheets of drawings.

Embodiment

Figure 1:
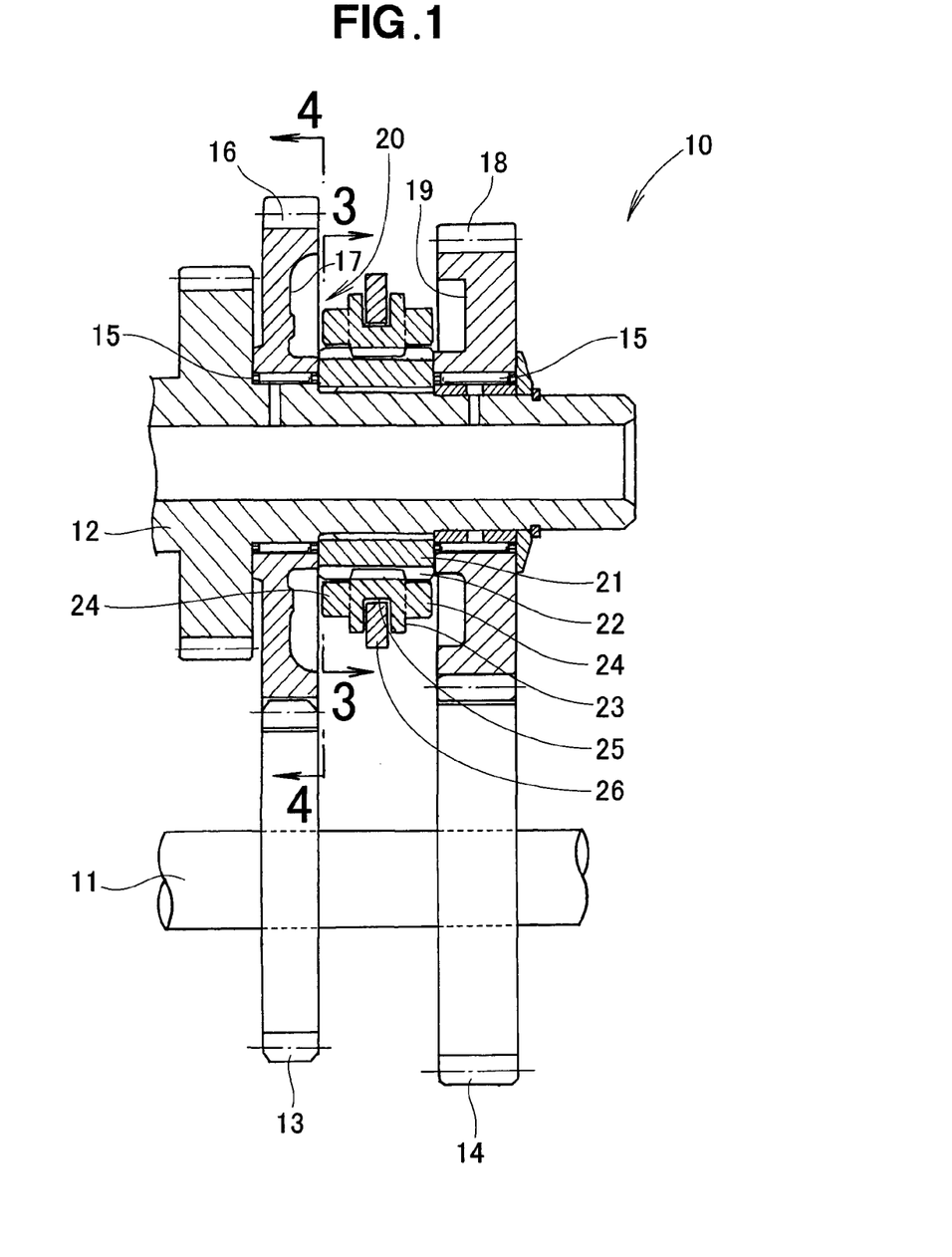
FIG. 1 is a partial cross-sectional view of a reduction gear incorporating therein a dog clutch according to the present invention.

As shown in FIG. 1, a reduction gear 10 includes a driving shaft 11 and a driven shaft 12. A first gear 13 and a second gear 14 of a larger diameter than the first gear 13 are mounted by press-fitting on the driving shaft 11 in an integral fashion.

A third gear 16 as a driving-side rotating body is rotatably mounted on the driven shaft 12 via a needle bearing 15. The third gear 16 has recessed parts 17 on its one side in an axial direction thereof and is constantly meshing with the first gear 13. A fourth gear 18 is rotatably mounted on the driven shaft 12 via a needle bearing 15. The fourth gear 18 has recessed parts 19 on its one side in an axial direction thereof and is constantly meshing with the second gear 14.

A tubular guide 21 is fitted on the driven shaft 12 in such a manner as to be sandwiched between the third gear 16 and the fourth gear 18. A driven-side rotating body 23 is slidably mounted on the tubular guide 21 via a spline 22 so as to be able to move in an axial direction. The driven-side rotating body 23 has protruding parts 24 on both sides in an axial direction thereof and is formed with an annular groove 25 in an outer circumferential surface thereof. A shift fork 26 is fitted in the annular groove 25.

The third gear 16 as the driving-side rotating body and the driven-side rotating body 23 together form a dog clutch 20. The dog clutch 20 is connected to a power system and performs connection/disconnection of power from the power system, as will be described later on.

The driven-side rotating body 23 is normally disposed in a neutral position. When the driving shaft 11 is rotated, the third gear 16 and the fourth gear 18 are rotated by the first gear 13 and the second gear 14, respectively. In this instance, however, due to the presence of the needle bearings 15, the third and fourth gears 16, 18 are rotating idle relative to the driven shaft 12 and the driven shaft 12 is not rotated.

Figure 2:
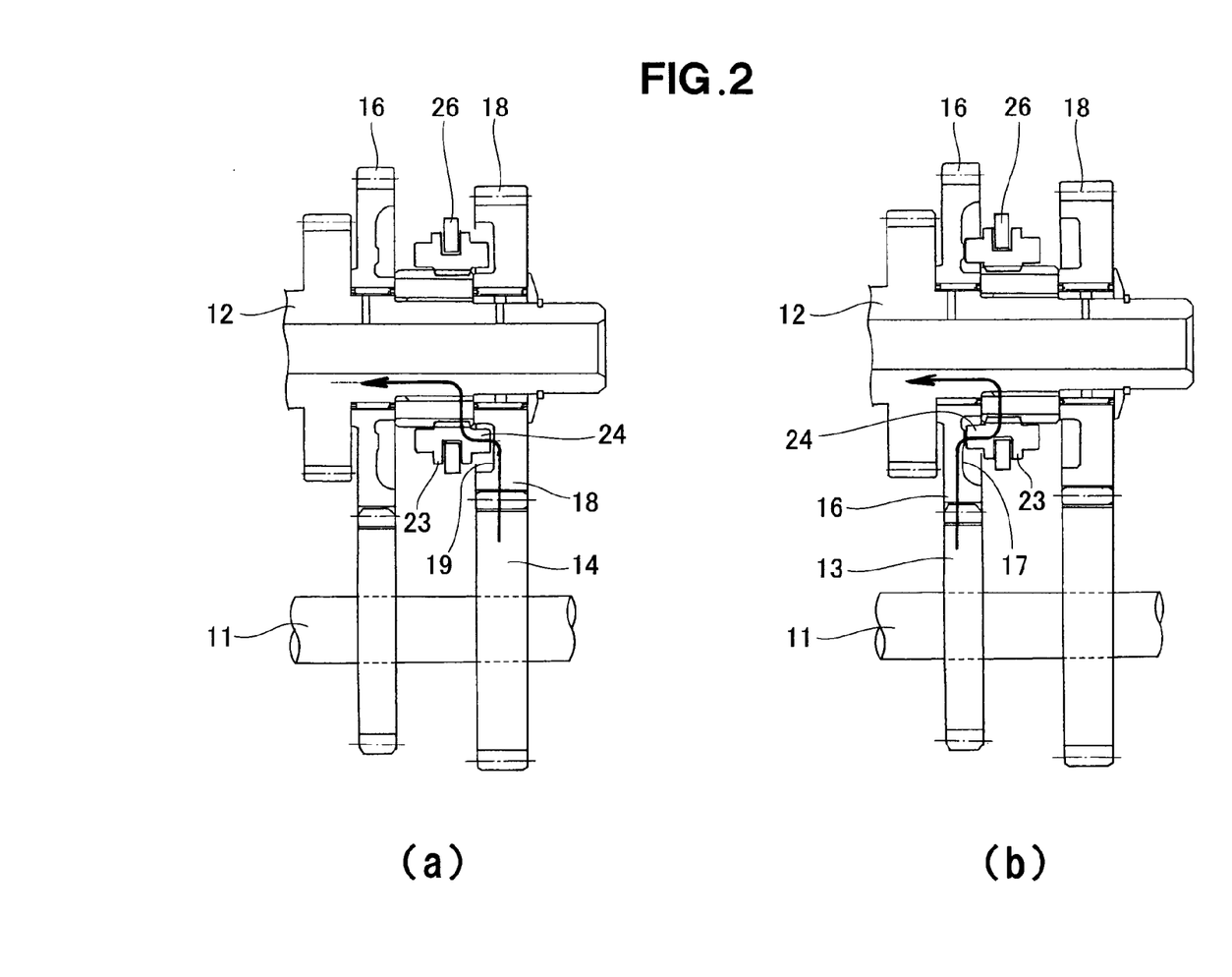
FIG. 2 is a diagrammatical view showing operation of the reduction gear.

When the shift fork 26 is operated to move or displace the driven-side rotating body 23 in an axial direction, the protruding parts 24 provided on one side in the axial direction of the driven-side rotating body 23 are brought into meshing engagement with the recessed parts 19 of the fourth gear 18 as shown in FIG. 2(a), or alternatively the protruding parts 24 provided on the other side in the axial direction of the driven-side rotating body 23 are brought into meshing engagement with the recessed parts 17 of the third gear 16 as shown in FIG. 2(b).

In the case shown in FIG. 2(a), the fourth gear 18 and the driven-side rotating body 23 are mechanically connected together so that the driven shaft 12 is rotated by the driving shaft 11 via the second gear 14 and the fourth gear 18. Alternatively, in the case shown in FIG. 2(b), the third gear 16 and the driven-side rotating body 23 are mechanically connected together so that the driven shaft 12 is rotated by the driving shaft 11 via the first gear 13 and the third gear 16. Since the first gear 13 and the second gear 14 have different diameters, a rotational speed achieved by the driven shaft 12 in the case of FIG. 2(a) is different from that in the case shown in FIG. 2(b). A speed change can thus be achieved by operation of the shift fork 26.

In FIG. 1, the relation between the driving shaft 11 and the driven shaft 12 can be reversed in which instance reference numeral 12 denotes a driving shaft, 11 denotes a driven shaft, 23 denotes a driving-side rotating body, and 16 denotes a driven-side rotating body. The protruding parts 24 may be provided on one of the driving-side rotating body (third gear) 16 and the driven-side rotating body 23, and the recessed parts 17 may be provided in the other of the driving-side rotating body (third gear) 16 and the driven-side rotating body 23.

Figure 3:
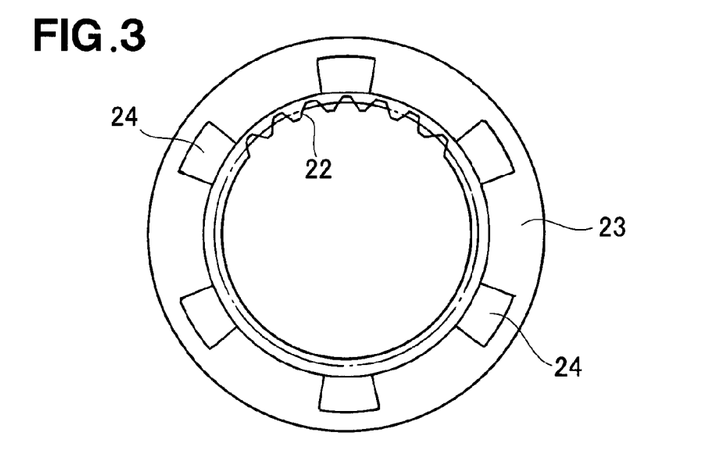
FIG. 3 is a view looking from the direction of arrow of the 3-3 line of FIG. 1.

As shown in FIG. 3, the driven-side rotating body 23 is in the form of a ring having a spline 22 formed on an inner circumferential surface thereof, and a plurality (six in the illustrated embodiment) of protruding parts 24 formed with even pitches on a side surface thereof on the front side of the drawing sheet.

Figure 4:
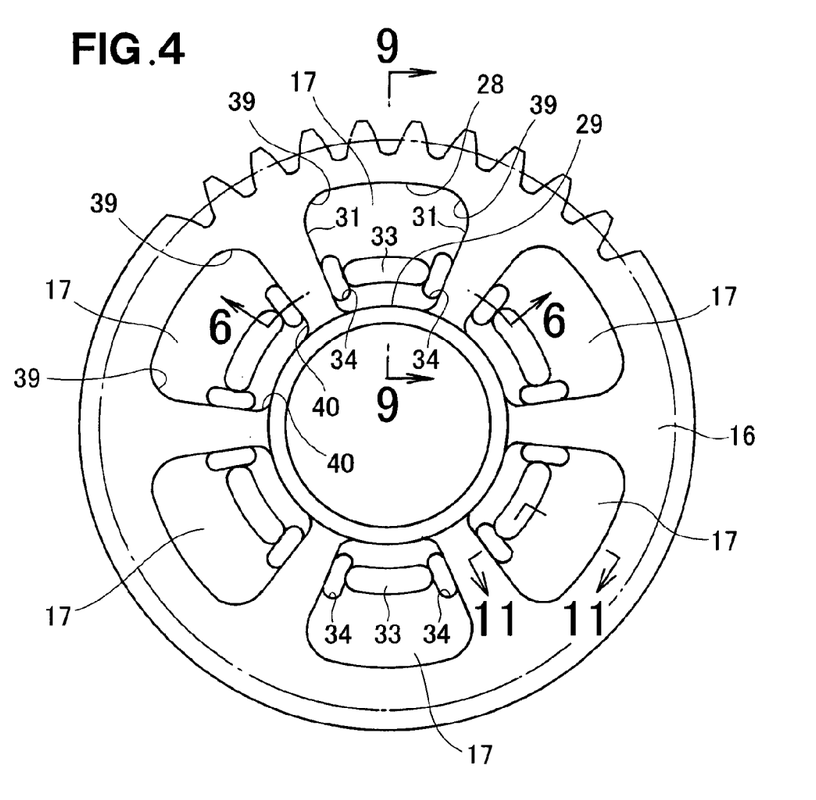
FIG. 4 is a view looking from the direction of arrow of the 4-4 line of FIG. 1.

As shown in FIG. 4, the third gear 16 has a plurality (six in the illustrated embodiment) of recessed parts 17. The recessed parts 17 have a generally trapezoidal shape having an inner edge 29 and an outer edge 28 longer than the inner edge 29. The outer edge 28 and the inner edge 29 are arc-shaped and form part of circles having a common center coincidental with a center of rotation of the third gear 16. Both ends of the outer edge 28 and both ends of the inner edge 29 are connected together by torque-receiving surfaces 31, 31 via large-radius arch-shaped surfaces 39 and small-radius arc-shaped surfaces 40. The large-radius arc-shaped surfaces 39 have a radius of curvature larger than a radius of curvature of the small-radius arc-shaped surfaces 40.

Figure 5:
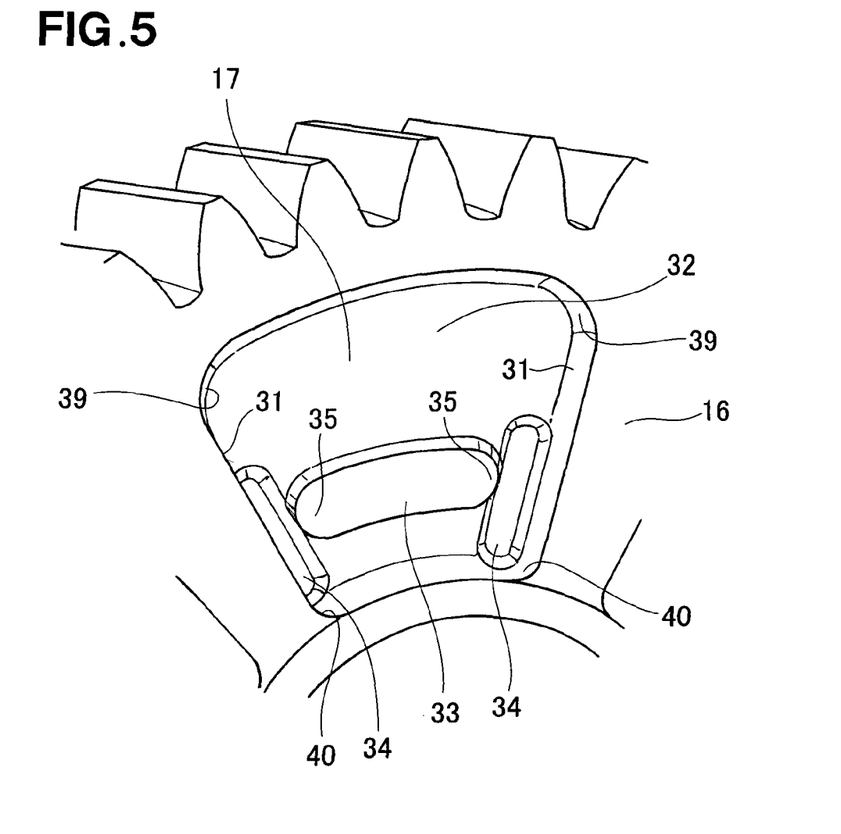
FIG. 5 is a perspective view of a recessed part.

As shown in FIG. 5, each of the recessed parts 17 has a bottom face 32, a strip-shaped island part 33 protruding from the bottom face 32 toward the front side of the drawing sheet and extending in a circumferential direction of the third gear 16, and groove parts 34 provided between the island part 33 and the torque-receiving surfaces 31 and recessed deeper from bottom face 32 toward the back side of the drawing sheet. The strip-shaped island part 33 has opposite ends 35, 35 in the circumferential direction that are rounded in a semicircular shape.

Figure 6:
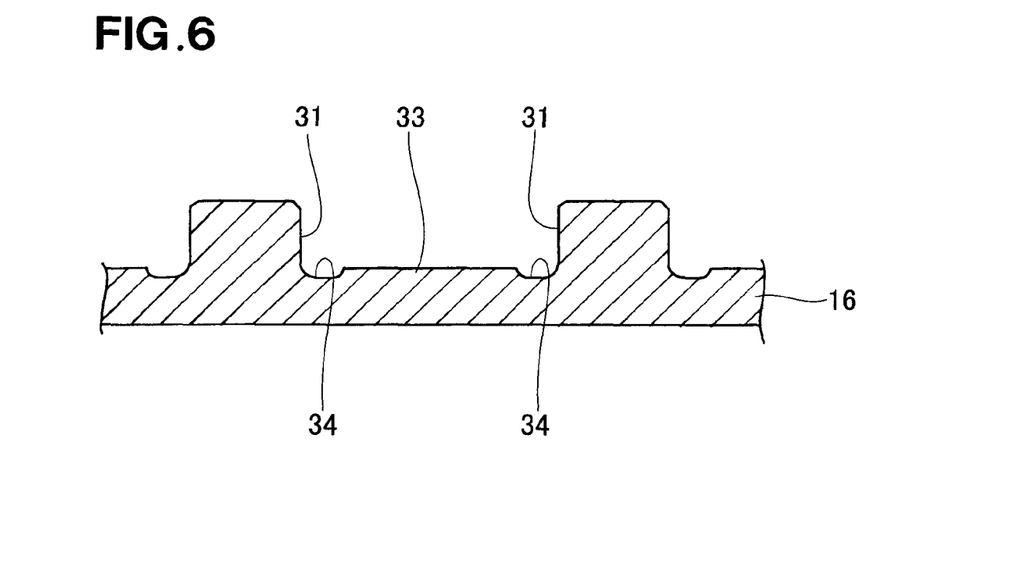
FIG. 6 is a cross-sectional view taken along the line 6-6 of FIG. 4.

As shown in FIG. 6, each of the groove parts 34, 34 is provided between the island part 33 and one of the torque-receiving surfaces 31, 31.

Figure 7:
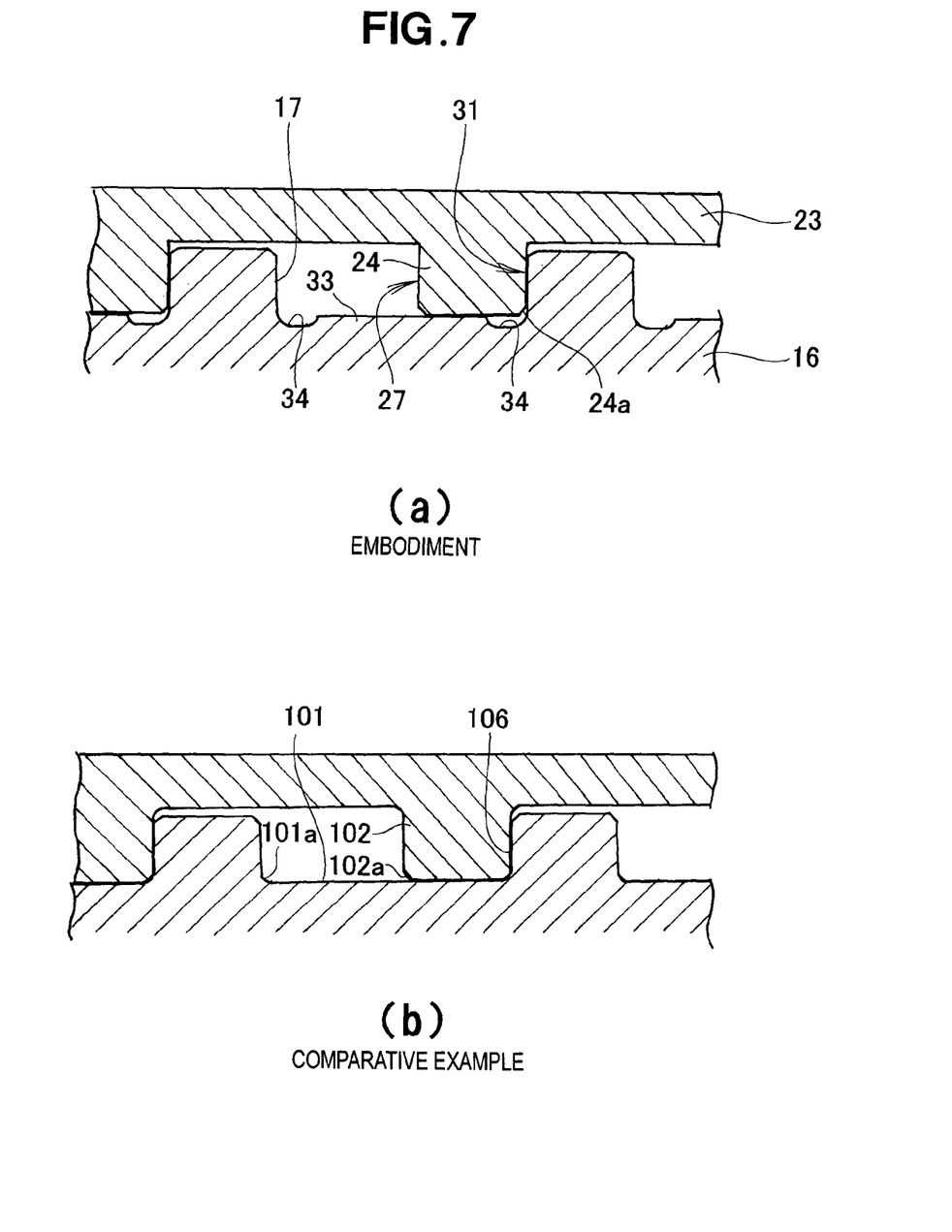
FIG. 7 is a view showing dog clutches.

As shown in FIG. 7(a), the protruding parts 24 of the driven-side rotating body 23 are fit in respective ones of the recessed parts 17 of the third gear 16, and as the tip ends of the protruding parts 24 slide on the island parts 33, side surfaces 27 on one side of the respective protruding parts 24 come into abutment with the torque-receiving surfaces 31 on one side of the recessed parts 17.

An arrangement according to a comparative example shown in FIG. 7(b) is frequently used, wherein in case of a cutting work, base corners 101a of each recessed part 101 are formed, as general tolerances, into arc-shaped surfaces having a radius of curvature of about 0.2 to about 0.5 mm. In order to avoid interference with the base corners 101a of the recessed part 101, top corners 102a of each protruding part 102 are formed into arc-shaped surfaces having a radius of curvature which is larger than a radius of curvature of the base corners 101a of the recessed part 101.

A consideration will be given about a case where the arc-shaped surfaces at the base corners 101a are formed by forging. In order to reduce breakage of a forging mold or die at top corners of a protruding part that is used to form arc-shaped surfaces at the base corners 101a, it may be considered that the top corners of the protruding part of the forging die are formed into arc-shaped surfaces having a radius of curvature more than 1.0 mm. By thus providing the arc-shaped surfaces with more than 1.0 mm radius of curvature, the height of the torque-receiving surfaces 106 in an axial direction of the driving-side or driven-side rotating body becomes small, a desired strength of the torque-receiving surfaces 106 is difficult to maintain. To deal with this problem, it may be considered that the torque-receiving surfaces 106 are made longer in the axial direction. However, with the torque-receiving surfaces 106 thus elongated in the axial direction, the recessed parts 17 of the third gear 16 and the protruding parts 24 of the driven-side rotating body 23 are made longer in the axial directions thereof. As a result, structural parts of the reduction gear 10 are increased in size, leading to an undesirable cost increase.

As a countermeasure, it may be considered that a desired length, in the axial direction, of the torque-receiving surfaces 106 be maintained by reducing the radius of curvature of the arc-shaped surfaces to such an extent comparable to the one obtained by the cutting process. In other words, the arc-shaped surfaces at the base corners 101a of the recessed part 101 are made smaller than 1.0 mm so as to secure the desired length of the torque-receiving surfaces 106 in the axial direction of the rotating body. To this end, the top corners of each protruding part of the forging die, which is used for forging the arc-shaped surfaces at the base corners 101a, should be formed into arc-shaped surfaces having a radius of curvature smaller than 1.0 mm. However, a forging die having protruding parts with top corners more than 1.0 mm is not desirable because due to stress concentration occurring during a forging process, the forging die is likely to be damaged or broken at the top corners of the protruding parts.

By contrast, according to the embodiment shown in FIG. 7(a), owing to the presence of the groove parts 34, top corners 24a of each protruding part 24 do never interfere with base corners of a corresponding one of the recessed parts 17, and a necessary length, in the axial direction, of the torque receiving surfaces 31 can be maintained. With this arrangement, the side surface 27 on one side of the protruding part 24 is reliably brought into abutment with the torque-receiving surface 31 so that a torque is transmitted from the driving-side rotating body (third gear) 16 to the driven-side rotating body 23. Bottom corners of each groove part 34 may be made to have a radius of curvature more than 1.0 mm (preferably 1.5 mm or more), so that the top corners of each protruding part of the forging die becomes hard to be damaged or broken.

A method of producing the recessed part 101 and a method of producing the recessed part 17 will be described with reference to FIGS. 8(a) to 8(d). For convenience of explanation, FIG. 8(b) illustrates a conventional production method as a comparative example, and the FIGS. 8(c) and 8(d) illustrate the production method according to the embodiment of the present invention.

Figure 8:
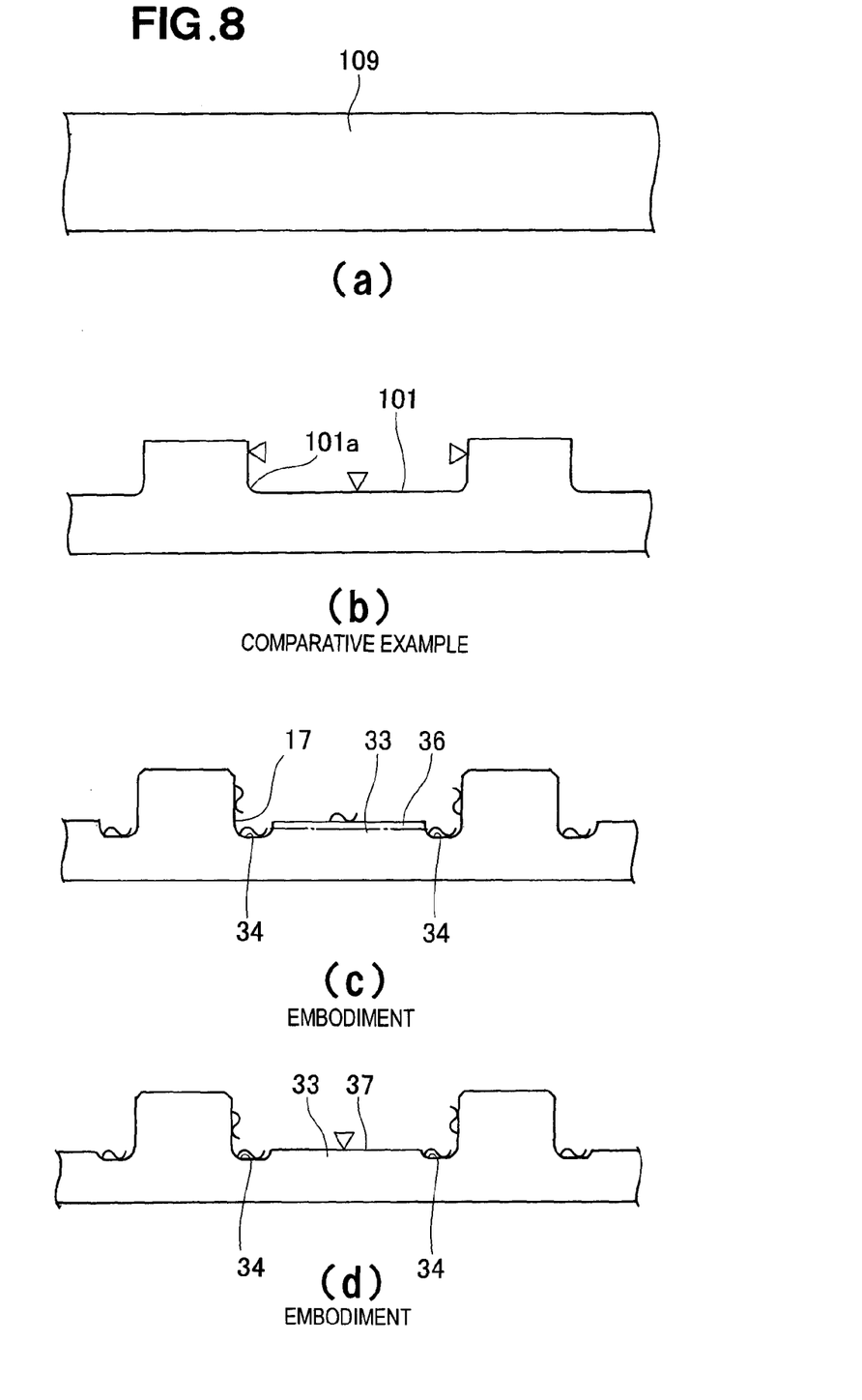
FIG. 8 is a view showing dog-clutch producing methods.

According to the comparative example, a blank material or workpiece 109 is provided, as shown in FIG. 8(a). The workpiece 109 is then subjected to a cutting process to thereby form recessed parts 101, as shown in FIG. 8(b). In FIG. 8(b), reference symbol "V" denotes a finished surface.

By contrast, according to the embodiment of the present invention, a blank material or workpiece 109 is provided, as shown in FIG. 8(a). Then, as shown in FIG. 8(c), recessed parts 17 are formed in the workpiece 109 by a plastic work method using a forging die (described later). In this stage, surfaces of groove parts 34, 34 and an island part 33 are surfaces as forged. Reference symbol "~" denotes a surface as forged (may also called "forged mill scale").

The island part 33 has a height including a cutting margin at a top part thereof. The top part of the island part 33 is shaved off by a milling cutter so that the island part 33 has a cut surface 37 at a top end thereof, as shown in FIG. 8(d). A bottom face 32, the groove parts 34 and other parts remain unfinished and have surfaces as forged. The amount of chips generated during the cutting process shown in FIG. 8(d) is extremely smaller than that in the cutting process shown in FIG. 8(b).

Figure 9:
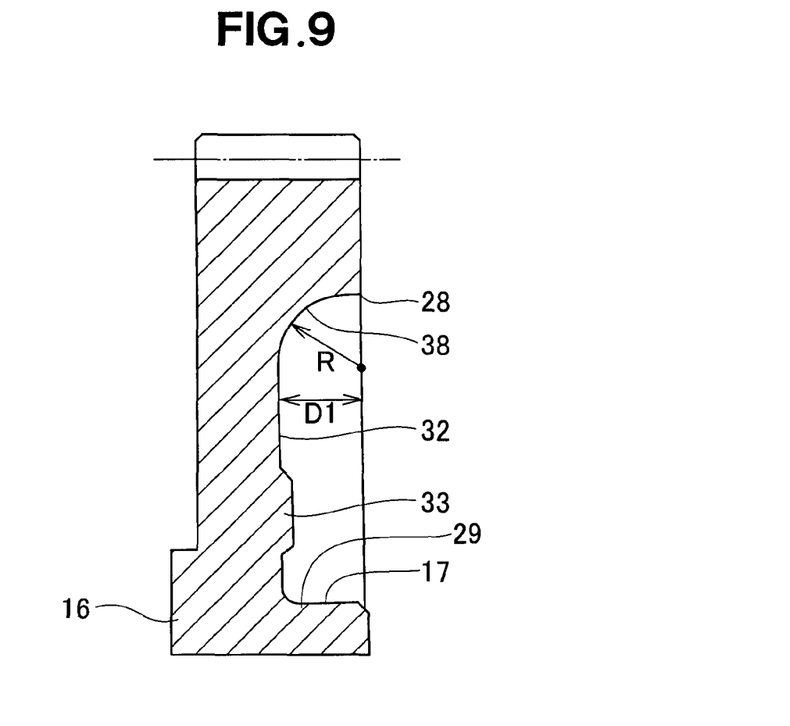
FIG. 9 is a cross-sectional view taken along the line 9-9 of FIG. 4.

As shown in FIG. 9, the island part 33 in each recessed part 17 protrudes from the bottom face 32. Preferably, in a cross-sectional view, the outer edge 28 is connected to the bottom face 32 via an arc-shaped surface 38 having a radius of curvature R equal to or greater than a depth D1 of the bottom face 32 of the recessed part 17.

Figure 10:
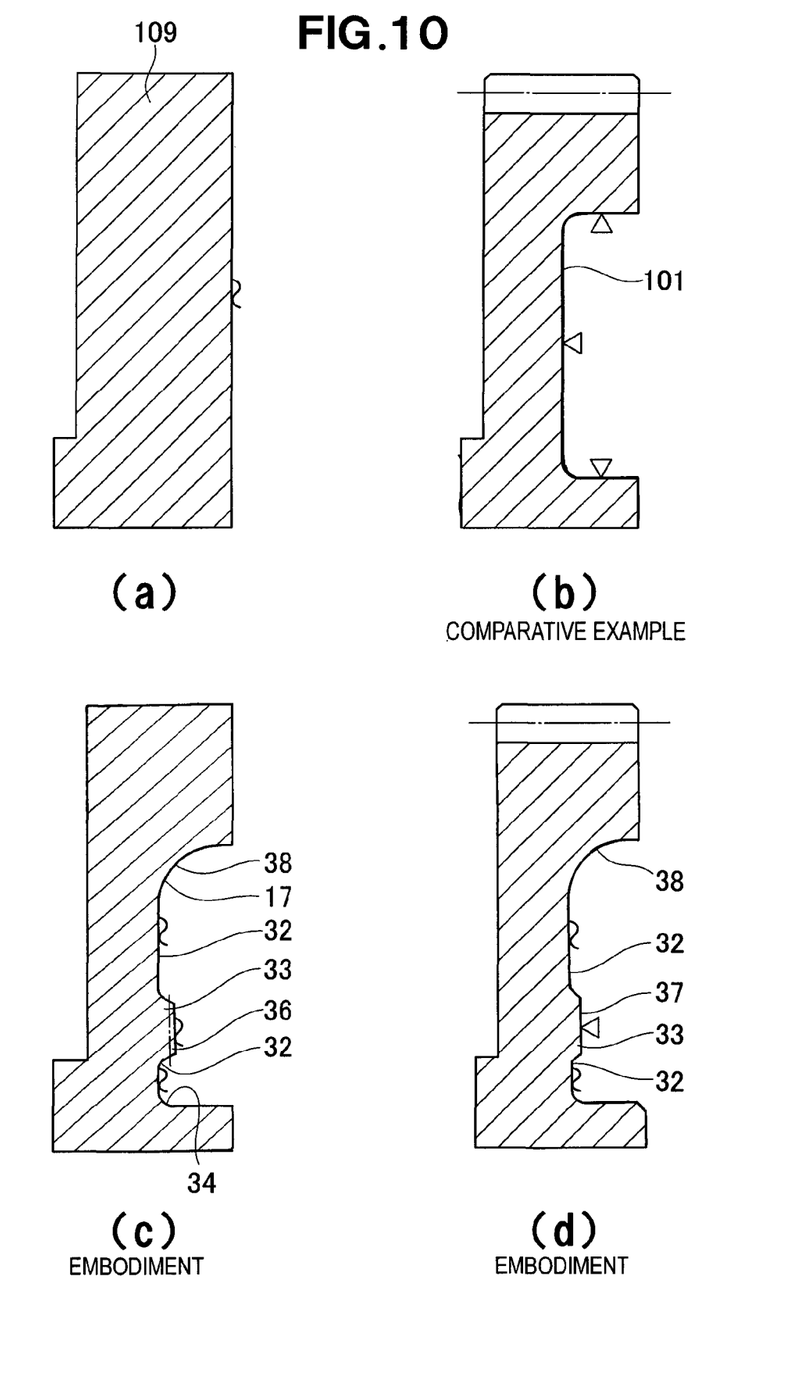
FIG. 10 is a view showing in cross section the dog-clutch producing methods.

A method of producing the recessed part 17 shown in FIG. 9 will be described with reference to FIG. 10. FIG. 10(b) shows a conventional method as a comparative example, and FIGS. 10(c) and 10(d) show a production method according to the embodiment of the present invention.

According to the comparative example, a blank material or workpiece 109 is provided, as shown in FIG. 10(a). The workpiece 109 is then subjected to a cutting process to form a recessed part 101, as shown in FIG. 10(b). In FIG. 10(b), reference symbol "V" denotes a finished surface.

By contrast, according to the embodiment of the present invention, a blank material or workpiece 109 is provided, as shown in FIG. 10(a). Then, as shown in FIG. 10(c), recessed parts 17 are formed in the workpiece 109 by using a forging die (described later). In this stage, a bottom face 32, a surface of an island part 33, and surfaces of groove parts 34, 34 are surfaces as forged. Reference symbol "~" denotes a surface as forged (or a forged mill scale surface). The island part 33 has a height including a cutting margin 36 at a top part thereof which will be shaved off by a milling cutter.

As a result, the island part 33 has a cut surface 37 at a top end thereof, as shown in FIG. 10(d). The bottom face 32, the groove parts 34 and other parts remain unfinished and still have surfaces as forged. The amount of chips generated during the cutting process and the cutting time are extremely smaller in the embodiment shown in FIG. 10(d) than in the comparative example shown in FIG. 10(b).

Figure 11:
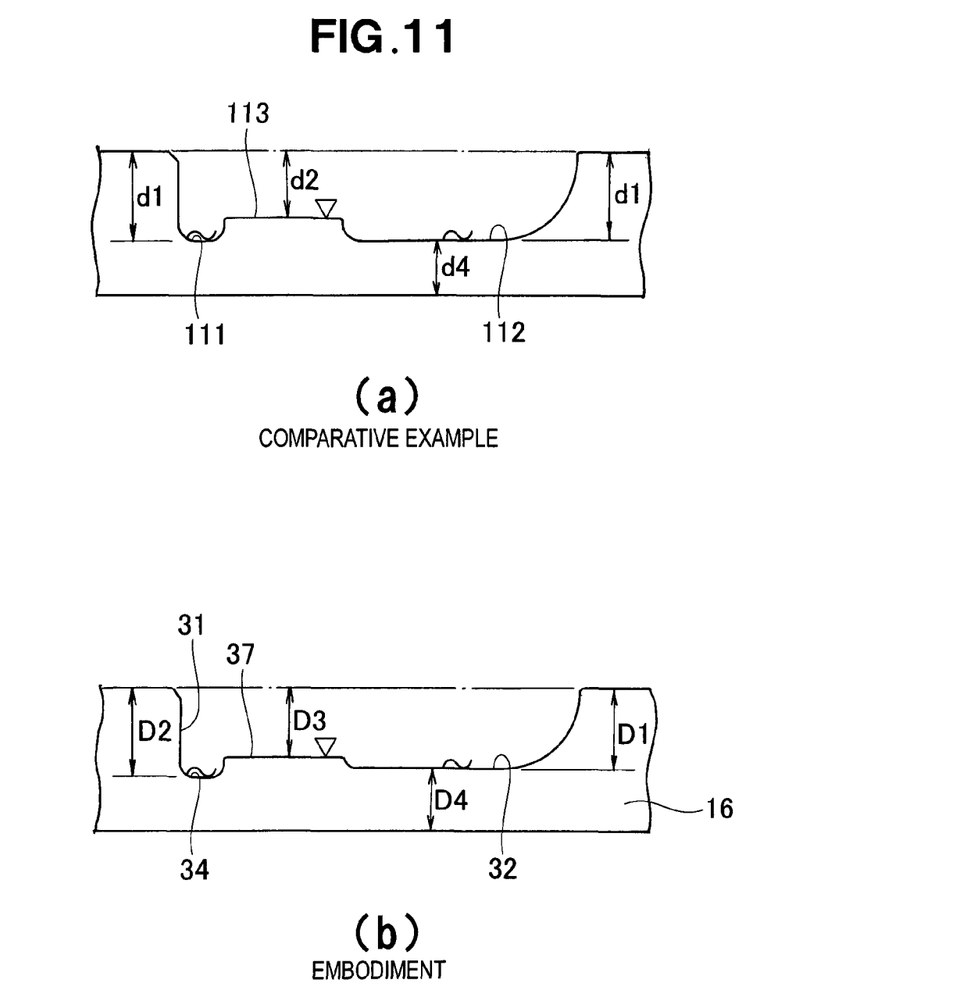
FIG. 11 is a cross-sectional view taken along the line 11-11 of FIG. 4.

The difference in depth between the groove parts 34, the cut surface 37 and the bottom face 32 in each recessed part 17 will be described with reference to FIGS. 11(a) and 11(b). FIG. 11(a) shows a comparative example, and FIG. 11(b) shows an embodiment of the present invention.

In the comparative example shown in FIG. 11(a), groove parts 111 and a bottom face 112 have a same depth d1, and a cut surface 113 has a depth d2 which is smaller than the depth d1. The bottom face 112 is the largest in terms of area ratio and, hence, the bottom face 112 is shown as having an enlarged width.

On the other hand, according to the embodiment of the present invention shown in FIG. 10(b), the groove parts 34 have a depth D2 larger than a depth D1 of the bottom face 32 (D1<D2), and a depth D3 of the cut surface 37 is smaller than the depth D1 of the bottom face 32 (D3<D1). The bottom face 32 is largest in terms of area ratio and, hence, the bottom face 32 is shown as having an enlarged width.

A comparison between a product thickness d4 measured at the bottom face 112 shown in FIG. 11(a) and a product thickness D4 measured at the bottom face 32 shown in FIG. 11(b) shows that the product thickness D4 is larger than the product thickness d4 (d4<D4). The strength of the third gear 16 as the driving-side rotating body increases as the product thickness D4 becomes large. Furthermore, in order to extend service life of the forging die, it is necessary to reduce stress exerted on the forging die. It is therefore desirable that the bottom face 32 having a large area is formed to be shallower than the groove parts 34.

On the other hands, according to the embodiment of the present invention shown in FIG. 11(b), the projecting length of the forging die relative to the workpiece 109 is longer at a part used for forge-shaping the groove parts 34 (i.e., groove-part-forming projections 52 described later) than at another part used for forge-shaping the bottom face 32 (i.e., a bottom-face-forming protrusion 51 described later). The groove-part-forming projections 52 are therefore likely to be subjected to stress concentration. However, the stress concentration can be suppressed by setting the radius of curvature of the bottom corners of the groove parts 34 to be more than 1.00 mm (preferably, 1.50 mm or more). Furthermore, because the groove parts 34 are formed so as to be deeper than the bottom face 32, the top end of the protruding part 24 can smoothly slide on the cut surface 37 without interference with the groove parts 34 even when the forge-shaped groove parts 34 become somewhat shallower than as desired due to slight wear of the groove-part-forming projections 52 of the forging die. Thus, the side surface 27 on one side of the protruding part 24 is reliably brought into abutting engagement with the torque-receiving surface 31 on a corresponding side of the recessed part 17.

Figure 12:
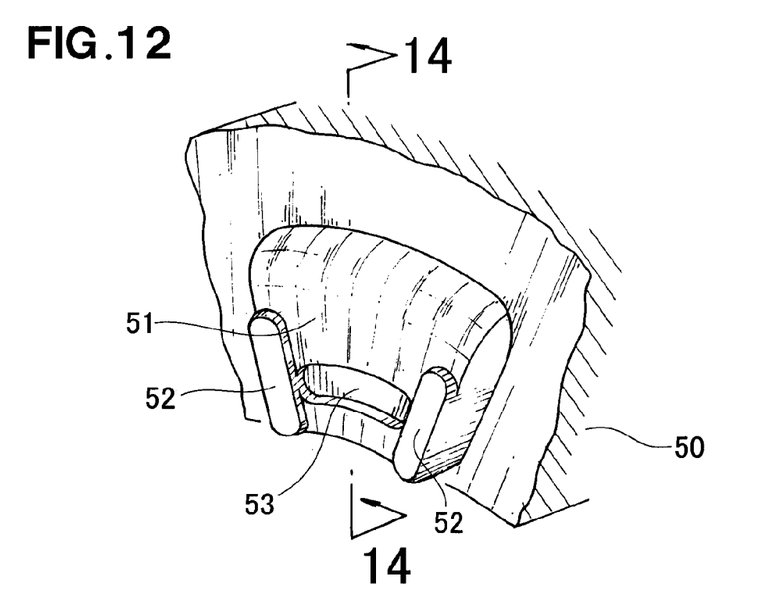
FIG. 12 is a perspective view of a part of a forging die.

The structure of a forging mold or die will be described with reference to FIGS. 12 to 14. Referring now to FIG. 12, the foregoing die 50 includes a bottom-face-forming protrusion 51, two groove-part-forming projections 52, 52 protruding from opposite end portions, in a circumferential direction, of the bottom-face-forming protrusion 51, and an island-part-forming groove 53 formed in the bottom-face-forming protrusion 51 and extending between the groove-part-forming projections 52, 52.

Figure 13:
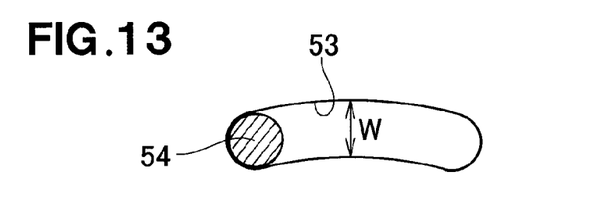
FIG. 13 is a front elevational view of an island-part-forming groove shown in FIG. 12.

As shown in FIG. 13, the island-part-forming groove 53 has both ends in the circumferential direction which are rounded into a semicircular shape. The rounded semicircular ends of the island-part-forming groove 53 can be readily produced by a single feed stroke of an endmil 54 having an outside diameter corresponding to a width W of the island-part-forming groove 53. Man-hours required for producing the island-part-forming groove 53 of the forging die 50 can thus be reduced. The island-part-forming groove 53 having rounded semicircular ends can effectively avoid the occurrence of stress concentration and contributes to further extension of the service life of the forging die 50.

Figure 14:
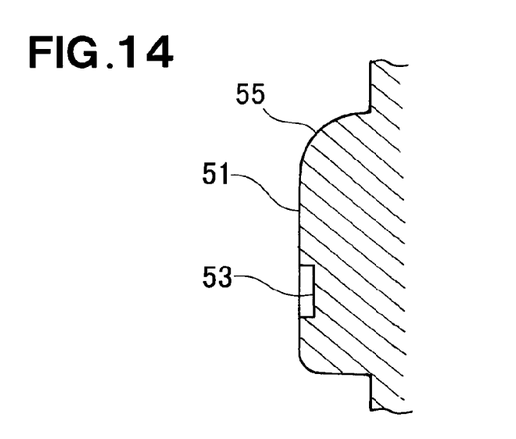
FIG. 14 is a cross-sectional view taken along the line 14-14 of FIG. 12.

As shown in FIG. 14, an upper edge of the bottom-face-forming protrusion 51 is rounded into an arc-shaped surface 55 having a radius of curvature equal to or greater than a height of the bottom-face-forming protrusion 51. By thus providing the arc-shaped surface 55, the durability of the bottom-face-forming protrusion 51 can be increased and the service life of the forging die 50 is further extended.

Figure 15:
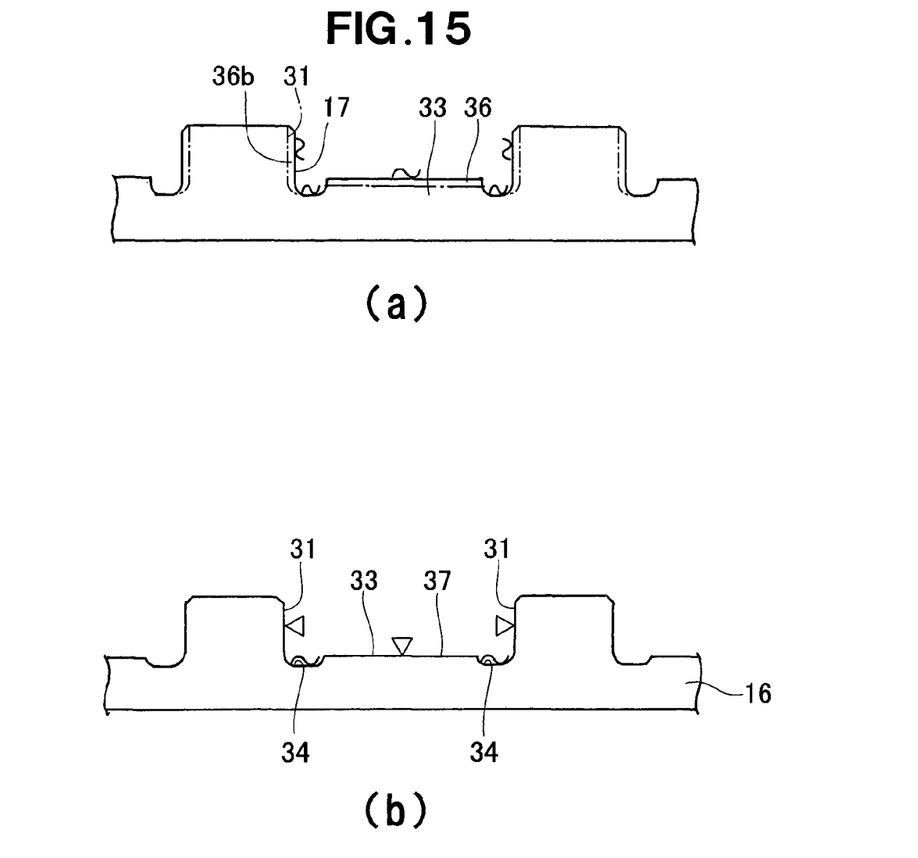
FIG. 15 is a view showing a modification of the dog-clutch producing methods shown in FIG. 8.

As shown in FIG. 15(a), each of the recessed parts 17 as formed has a configuration in which the island part 33 has a height including a cutting margin 36 and the torque-receiving surfaces 31 is added with a cutting margin 36b. The cutting margins 36, 36b are then shaved off by a cutting process, so that a driving-side rotating body 16, having a cut surface 37 formed on a top end of each island part 33 and finished torque-receiving surfaces 31 in each recessed part 17, can be obtained as shown in FIG. 15(b).

The production method shown in FIGS. 15(a) and 15(b) is recommended when the torque-receiving surfaces 31 require increased accuracy. As shown in FIG. 15(a), the recessed part 17 is formed by forging and the cutting margins 36, 36b are not large in thickness. Thus, the production method can significantly reduce the amount of chips generated as compared to a conventional production method in which the entire part of the recessed part is formed by a cutting process.

In the illustrated embodiment, the driving-side rotating body 16 takes the form of a gear incorporated in a reduction gear. However, the driving-side rotating body 16 is not limited to the gear as in the illustrated embodiment but it can be also applied to a rotating body forming part of a positive clutch also called "dog clutch" or "jaw clutch".

INDUSTRIAL APPLICABILITY

With the arrangements so far described, the present invention can be used advantageously as a positive clutch also called "dog clutch" or "jaw clutch".

REFERENCE SIGNS LIST

16: driving-side rotating body (third gear)
17: recessed part
20: dog clutch
23: driven-side rotating body
24: protruding part
27: side surface of protruding part
28: outer edge
29: inner edge
31: torque-receiving surface
32: bottom face
33: island part
34: groove part
35: semicircular end
36: cutting margin
37: cut surface
38: arc-shaped surface
D1: depth of bottom face
D2: depth of groove part
D3: depth of cut surface

The invention claimed is:

1. A dog clutch having protruding parts provided on one of a driving-side rotating body and a driven-side rotating body and recessed parts provided in the other of the driving-side rotating body and the driven-side rotating body, the protruding parts being adapted to be brought into meshing engagement with the recessed parts to thereby transmit a driving force from the driving-side rotating body to the driven-side rotating body via abutting engagement between side surfaces of the protruding parts and corresponding torque-receiving surfaces of the recessed parts, wherein:

each of the recessed parts has a bottom face, a strip-shaped island part protruding from the bottom face and extending in a circumferential direction of the driving-side or driven-side rotating body, and groove parts between the island part and the torque-receiving surfaces, the island part receiving a tip surface of the protruding part when the protruding parts are brought into meshing engagement with the recessed parts, and the groove parts preventing top corners of each protruding part from interfering with base corners of a corresponding one of the recessed parts;

the groove parts and the bottom face are formed by a forging die and have respective surfaces as forged;

the island part has a cut surface, the cut surface being formed by cutting a top part of the island part after the island part has been formed by the forging die;

the groove parts are formed so as to be deeper than the bottom face, and the cut surface is formed so as to be shallower than the bottom face;

the torque-receiving surfaces include a first torque-receiving surface and a second torque-receiving surface that opposes the first torque-receiving surface, the island part extends between the first torque-receiving surface and the second torque-receiving surface so as to have a first end adjacent to the first torque-receiving surface and a second end adjacent to the second torque-receiving surface, and the groove parts include a first groove part disposed between the first end of the island part and the first torque-receiving surface, and a second groove part disposed between the second end of the island part and the second first torque-receiving surface; and the first groove part is disposed immediately adjacent to the first end of the island part and the first torque-receiving surface, and the second groove part is disposed immediately adjacent to the second end of the island part and the second torque-receiving surface.

2. The dog clutch according to claim 1, wherein the strip-shaped island part has one end and an opposite end that are rounded into a semicircular shape.

3. The dog clutch according to claim 1, wherein the driving-side rotating body has a gear section formed on a radially outer side of the recessed parts, each of the recessed parts has a substantially trapezoidal shape and includes an arc-shaped inner edge contiguous with inner ends of the torque-receiving surfaces, and an arc-shaped outer edge contiguous with outer ends of the torque-receiving surfaces, the outer edge being formed to be longer than the inner edge, and the outer edge is connected to the bottom face via an arc-shaped surface having a radius of curvature equal to or greater than a depth of the bottom face.

4. The dog clutch according to claim 3, wherein an arc-shaped surface formed between the outer edge and each of the torque-receiving surfaces has a radius of curvature larger than a radius of curvature of an arc-shaped surface formed between the inner edge and each of the torque-receiving surfaces.

* * * * *